United States Patent Office 3,264,355
Patented August 2, 1966

3,264,355
HALOGEN-SUBSTITUTED DIBENZ-IODOLIUM SALTS
William N. Cannon, Greenwood, Ind., assignor to Eli Lilly and Company, Indianapolis, Ind., a corporation of Indiana
No Drawing. Filed Dec. 28, 1964, Ser. No. 421,607
6 Claims. (Cl. 260—606.5)

This application is a continuation-in-part of my copending application Serial No. 123,450, filed July 12, 1961, now abandoned.

This invention relates to a group of novel halogen-substituted dibenziodolium salts.

The compounds provided by this invention can be represented by the following formula:

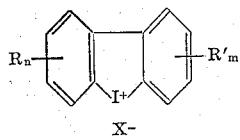

wherein R and R' are members of the group consisting of chlorine and bromine, $n$ is a member of the group consisting of 1, 2 and 3, $m$ is a member of the group consisting of 0, 1, 2 and 3, and X⁻ is an anion.

The compounds represented by the above formula are denominated as halogenated dibenziodolium compounds and exist in the form of salts having as the cation, a halogenated dibenziodolium ion, and as the anion, one derived from an acid having an acidic dissociation constant (Ka) of $10^{-13}$ or greater. This constant is frequently expressed as the negative logarithm, pKa. Thus, the anions useful in forming salts with the above halogenated dibenziodolium cations can also be defined as those having a pKa of 13 or less. The salts corresponding to the above formula are fully ionized, both in the solid, crystalline state and in aqueous solution. It is the chief function of these salts to furnish a halogenated dibenziodolium cation upon solution in aqueous solvents, since it is these cations, and not the anions with which they are associated, that have the microbiocidal property which is the chief utility of the compounds of this invention. Since it is the halogenated dibenziodolium cation which has microbiocidal utility, a utility which is not affected by the nature of the anion with which the halogenated dibenziodolium cation is associated in the solid state, the nature of the anion consequently is immaterial, provided it comes from an acid having a sufficiently high acidic ionization constant ($10^{-13}$ or greater) to be capable of forming a salt with the halogenated dibenziodolium cation. Among acids having pKa's of 13 or less are included all the common inorganic acids such as sulfuric, sulfurous, nitric, nitrous, phosphoric, phosphorous, hydriodic, hydrochloric, hydrobromic, hydrofluoric, perchloric, chloric, chlorous, thiocyanic, cyanic, arsenic, arsenous, boric, carbonic, selenious, hydrazoic, telluric, tellurous, and the like. Lists of other suitable acids, giving their acid dissociation constants, either as such or as a pKa, can be found in Lange's Handbook of Chemistry (Handbook Publishers, Inc., Sandusky, Ohio), or in other similar reference works.

Many of the above acids can give rise to more than one anion; for example, sulfuric gives rise to the sulfate and bisulfate anions, and both phosphoric and phosphorous acids give rise to three anions. Each of these anions, of course, is derived from a different acid having its own acid dissociation constant, and in some instances only the anions produced by the primary dissociation will form a salt with a dibenziodolium cation. In addition to the above considerations, it should also be pointed out that any of the acids which have a common name, such as phosphoric, can exist in several forms depending on the degree of hydration of the basic oxide giving rise to the anion. In the case of phosphoric acid, for example, the basic oxide is $P_2O_5$, and there are at least four common phosphoric acids—metaphosphoric acid, $HPO_3$, orthophosphoric acid, $H_3PO_4$, pyrophosphoric acid, $H_4P_2O_7$, and hypophosphoric acid, $H_4P_2O_6$—which are products of the hydration of $P_2O_5$. The same is true of sulfuric, boric, and other of the common di- or tribasic acids.

As pointed out above, the various phosphoric acids are formed by hydration of the oxide, $P_2O_5$. In forming these acids, it is possible to replace one of the molecules of water of hydration with a molecule of hydrogen peroxide, thus giving rise to a series of perphosphoric acids which correspond to each of the ordinary acids. These peracids can, of course, be formed in similar fashion from other oxides including $SO_3$, $SO_2$, $B_2O_5$, $P_2O_3$, and the like, and will be included within the scope of the anion in the above formula if the acid thus formed has an acid dissociation constant of $10^{-13}$ or greater.

In addition to the inorganic acids discussed above, there are many organic acids which have an acid dissociation constant of $10^{-13}$ or greater. Among such acids are the common aliphatic acids such as acetic, propionic, isobutyric, caproic, caprylic, and the like; the aromatic acids, including benzoic and naphthoic acids, as well as substituted benzoic and naphthoic acids such as bromobenzoic, nitrobenzoic, chloronaphthoic, and the like; barbituric acid and related substituted barbituric acids; phenol and substituted phenols including salicylic acid; dibasic aliphatic acids such as adipic, malonic, fumaric, and the like; dibasic aromatic acids such as phthalic acid; heterocyclic acids such as picolinic, nicotinic, quinolinic, furoic, and the like; and aromatic-substituted aliphatic acids such as phenylacetic, phenylbutyric, phenylmalonic, pyridine acetic, and the like, in addition to many others as will be apparent to those skilled in the art.

The compounds represented by the above formula are yellowish-white to white crystalline solids having a high melting point. Their solubility in water varies greatly, the iodides in general being the least soluble. The compounds can be prepared according to the following reaction scheme:

REACTION SCHEME

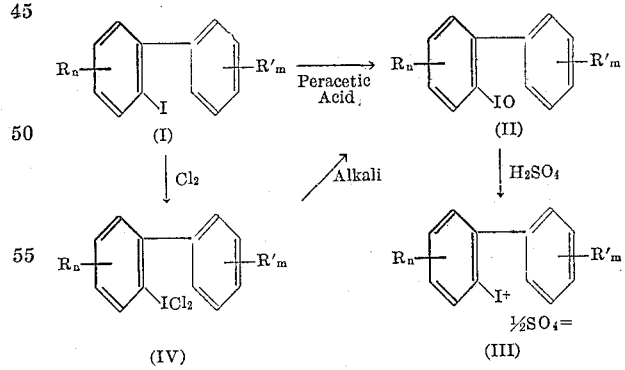

According to the above reaction scheme, a halogen-substituted o-iodobiphenyl (I) is treated with peracetic acid to give the halogen-substituted o-iodosobiphenyl compound (II). Reaction of the iodoso compound with sulfuric acid yields the desired halogen-substituted dibenziodolium compound as the sulfate or bisulfate salt (III). Alternatively, a halogen-substituted o-iodobiphenyl (I) is chlorinated to yield the o-iodobiphenyl dichloride compound (IV), treatment of which compound with alkali yields the iodoso compound (II), which is in turn converted to a dibenziodolium sulfate or bisulfate (III) as outlined above.

A third procedure is available for the preparation of only the iodide salts of the halogen-substituted dibenziodolium cation. This procedure involves the preparation of a halogen-substituted o,o'-diaminobiphenyl. Tetraazotization of the diamino compound followed by decomposition of the tetrazonium salt with potassium iodide yields instead of the expected o,o'-diiodobiphenyl, a halogen-substituted dibenziodolium iodide.

The products of the above processes are a sulfate, a bisulfate, or an iodide salt. If other salts are desired, these can be readily obtained through a metathetic process utilizing the sulfate or bisulfate salt; for example, a halogenated dibenziodolium sulfate will react with barium chloride to give a readily separable barium sulfate precipitate and a solution of the corresponding halogenated dibenziodolium chloride. Similarly, the use of barium hydroxide with the halogenated dibenziodolium sulfate or bisulfate yields the halogenated dibenziodolium hydroxide, which can be neutralized with any acid having a pKa of 13 or less. Suitable acids include nitric acid, phosphoric acid, acetic acid, phenol, and the like.

Compounds of this invention which are preparable by one of the above processes include the following:

Bis(2,2'-dichlorodibenziodolium) sulfate
2,3,4-trichlorodibenziodolium dihydrogen phosphate
3,3'-dibromodibenziodolium nitrate
2,2',4,4'-tetrachlorodibenziodolium phenate
2,4'-dibromodibenziodolium iodide
1-chlorodibenziodolium bromide
2,4-dichlorodibenziodolium bisulfate
2-chloro-4-bromodibenziodolium bisulfate The compounds of this invention are useful as agents for inhibiting the growth of microorganisms, including both pathogenic and nonpathogenic strains of gram-negative and gram-positive organisms, fungi, yeast, algae, and schistosomes. Among the organisms whose growth is inhibited by concentrations of 100 ppm. or less of a compound provided by this invention are the following:

*Staphylococcus aureus*
*Staphylococcus albus*
*Bacillus subtilis*
*Sarcina lutea*
*Mycobacterium tuberculosis*
*Mycobacterium avium*
*Escherichia coli*
*Proteus vulgaris*
*Pseudomonas aeruginosa*
*Aerobacter aerogenes*
*Klebsiella pneumoniae*
*Salmonella enteritidis*
*Shigella paradysenteriae*
*Brucella bronchiseptica*
*Vibrio metschnikovii*
*Saccharomyces pastorianus*
*Candida albicans*
*Trichophyton rubrum*
*Trichophyton interdigitale*
*Agrobacterium tumefaciens*
*Corynebacterium michiganese*
*Erwinia amylovora*
*Pseudomonas solanacearum*
*Xanthomonas phaseoli*
*Alternaria solani*
*Aspergillus niger*
*Botrytis cinerea*
*Ceratostomella ulmi*
*Colletotrichum pisi*
*Endoconidiophora fagacearum*
*Fusarium moniliforme*
*Glomerella cingulata*
*Helminthosporium sativum*
*Penicillium expansum*
*Phoma pigmentovora*
*Polyporus ostreatus*
*Pullularia sp.*
*Verticillium albo-atrum*
*Trichomonas vaginalis*
*Syphacia obvelata*
*Schistosoma mansoni*
*Clostridium welchii*
*Desulfovibrio desulfuricans*
*Braceteococcus cinnabarinus*
*Chlorella vulgaris*
*Scenedesmus naegeli*
*Stichococcus bacillaris*
*Trebouxia sp.*
*Scenedesmus basiliensis*

The compounds can be employed as antimicrobial agents either in solution or in dry form. Because of their extremely high activity, the active dibenziodolium compound is diluted for use with an inert extending medium such as water, talcum powder, shampoo, cutting oil, and the like. Likewise, the compounds of this invention can be provided as a concentrate or premix, such as a wettable powder or concentrate solution, for later dilution to the desired strength.

This invention is further illustrated by the following specific examples:

EXAMPLE I.—BIS(2-CHLORODIBENZIODOLIUM SULFATE

A solution of peracetic acid was prepared as follows: 25 ml. of 30 percent hydrogen peroxide were added dropwise with stirring to 100 ml. of acetic anhydride maintained at about 0° C. After the addition had been completed, the mixture was stirred at about 0° C. until homogeneous. The peracetic acid thus formed was then removed from the cooling bath and warmed to ambient room temperature. Ten grams of 2-iodo-5-chlorobiphenyl were dissolved in about 20 ml. of acetic anhydride and this solution was added dropwise with stirring to 50 ml. of the above peracetic acid solution. The reaction mixture was maintained at ambient room temperature for about 12 hours and was then cooled to about 5° C. Ten milliliters of 18 M sulfuric acid were added dropwise with stirring while maintaining the temperature of the reaction mixture in the range 5–10° C. After the addition of the sulfuric acid had been completed, the reaction mixture was removed from the cooling bath, and was warmed to ambient room temperature where it was kept for about 5 hours. Two hundred milliliters of cold water were added and the resulting mixture was stirred for about one hour and was then filtered to separate the precipitate of bis(2-chlorodibenziodolium) sulfate formed in the above reaction. Two recrystallizations of the precipitate from a mixture of dimethylformamide and water yielded purified bis(2-chlorodibenziodolium) sulfate melting at about 247–249° C.

Other compounds prepared by the above procedure include:

Bis(2,4-dichlorodibenziodolium) sulfate, prepared from 2-iodo-3,5-dichlorobiphenyl, melts at about 224–225° C. with decomposition after recrystallization from a water-dimethylformamide solvent mixture.

Bis(2-bromodibenziodolium) sulfate, prepared from 2-iodo-5-bromobiphenyl, melts at about 263–266° C. after recrystallization from an ethanol-water solvent mixture.

Bis(3,7-dichlorodibenziodolium) sulfate, prepared from 2-iodo-4,4'-dichlorobiphenyl, melts at about 274–275° C.

Bis(3-chlorodibenziodolium) sulfate, prepared from 2-iodo-4-chlorobiphenyl, melts at about 249–251°C.

EXAMPLE II.—BIS(2,4-DICHLORODIBENZIODOLIUM) SULFATE

Ten grams of 2-iodo-3,5-dichlorobiphenyl were dissolved in about 50 ml. of chloroform and the solution was cooled while being stirred to about 0° C. The temperature of the solution was maintained in the range 0–5° C. while chlorine gas was bubbled into the solution until the solution was saturated. Three hundred milliliters of hexane were added and the bubbling of chlorine into the solution was continued. Yellow crystals of 2-iodo-3,5-dichlorobiphenyl dichloride precipitated and were separated by filtration. The crystals melted at about 103–105° C.

Forty-two grams of 2-iodo-3,5-dichlorobiphenyl dichloride were mixed with 100 g. of crushed ice and 100 ml. of water. Ten grams of sodium hydroxide were dissolved in 100 ml. of water and the solution was added to the solution of the 2-iodo-3,5-dichlorobiphenyl dichloride with stirring over a period of about 30 minutes. Stirring was continued for another 4 hours while the reaction temperature was allowed to reach ambient room temperature. During this time the yellow crystals of 2-iodo-3,5-dichlorobiphenyl dichloride were replaced by white crystals of 2-iodoso-3,5-dichlorobiphenyl, which latter crystals were separated by filtration. The precipitate was dried as much as possible on the filter paper and was then dissolved while still slightly damp in about 300 ml. of glacial acetic acid. The solution was filtered to remove impurities and was then cooled to below 5° C., at which temperature it was held while 25 ml. of 18 M sulfuric acid were added in dropwise fashion over a 1.5-hour period. Bis(2,4 - dichlorodibenziodolium) sulfate thus formed began to precipitate before all of the sulfuric acid had been added. Stirring was continued while the reaction mixture was allowed to warm up to ambient room temperature, at which temperature it was stirred for another 14 hours. The bis(2,4-dichlorodibenziodolium) sulfate precipitate was separated by filtration. The separated precipitate was washed with water and was then slurried in benzene, thus removing some yellow color and leaving a white crystalline precipitate of bis(2,4-dichlorodibenziodolium) sulfate, which was again separated by filtration. The purified compound melted at about 224–225° C.

EXAMPLE III.—PREPARATION OF SALTS

Ten grams of bis(2-chlorodibenziodolium) sulfate were suspended in one liter of hot water. A solution of 6.6 g. of barium hydroxide octahydrate in a minimal volume of water was added, thus causing an immediate precipitate of insoluble barium sulfate. The reaction mixture was cooled with stirring to insure complete precipitation and coagulation of the barium sulfate, which was separated by filtration. Neutralization of the solution containing 2-chlorodibenziodolium hydroxide, with one equivalent of phosporic acid, yielded 2-chlorodibenziodolium dihydrogen phosphate.

Substitution of nitric acid, hydrochloric acid, and phenol for phosphoric acid in the above procedure yields, respectively, 2-chlorodibenziodolium nitrate, 2-chlorodibenziodolium chloride, and 2-chlorodibenziodolium phenate.

Other halogenated bis(dibenziodolium) sulfates of this invention can be substituted for bis(2-chlorodibenziodolium) sulfate in the above example in order to prepare other salts of the particular cation.

Intermediate halogenated 2-iodobiphenyls useful as starting materials in Examples I and II are prepared from the corresponding 2-amino compounds by diazotization and decomposition of the diazonium salt with aqueous potassium iodide. Illustrative preparative procedures include the following:

*Preparation 1.—2-iodo-5-bromobiphenyl*

Sixty-two grams of 2-amino-5-bromobiphenyl were dissolved in a mixture containing 25 ml. of 12 N hydrochloric acid and 250 ml. of water. A solution of 20.7 g. of sodium nitrite in 50 ml. of water were added slowly to the amine solution, which was maintained in the temperature range 0–5° C. The solution containing 2-phenyl-4-bromobenzenediazonium chloride formed in the above reaction was poured with stirring into a solution of 62.3 g. of potassium iodide dissolved in 125 ml. of water. After the initial vigorous evolution of nitrogen had subsided, the reaction mixture was warmed to about 50° C. 2-iodo-5-bromobiphenyl thus formed was extracted into benzene. The benzene solution was washed with water and was dried. The benzene was removed by evaporation in vacuo, leaving 2-iodo-5-bromobiphenyl as a residue. Distillation of the residue yielded fractions boiling in the range 125–140° C. at 0.5 mm. of mercury. Redistillation of combined fractions yielded 2-iodo-5-bromobiphenyl boiling in the range 128–132° C. at a pressure of about 0.5 mm. of mercury; $n_D^{25}=1.679$.

2-iodo-5-chlorobiphenyl was prepared from 2-amino-5-chlorobiphenyl by the above procedure. Boiling point $=110°$ C. at a pressure of about 0.05 mm. of mercury; $n_D^{25}=1.660$.

*Preparation 2.—2-iodo-4,4'-dichlorobiphenyl*

Following the procedure of Preparation 1, 2-amino-4,4'-dichlorobiphenyl was diazotized and the diazonium salt was decomposed by pouring it into a solution of potassium iodide, thus forming 2-iodo-4,4'-dichlorobiphenyl. The compound was isolated and purified by the procedure of Preparation 1. Distillation of 2-iodo-4,4'-dichlorobiphenyl thus prepared yielded three fractions boiling in the range 116–136° C. at a pressure of about 0.05 mm. of mercury. The redistillation of the combined fractions yielded purified 2-iodo-4,4'-dichlorobiphenyl boiling in the range 135–136° C. at a pressure of about 0.1 mm. of mercury.

*Preparation 3.—2-iodo-3,5-dichlorobiphenyl*

One hundred and nineteen grams of 2-amino-3,5-dichlorobiphenyl prepared according to the method of Scarborough and Waters, J. Chem. Soc., 92 (1927), were slurried in 1000 ml. of water. One hundred and forty-seven grams of 18 M sulfuric acid were added slowly thereto, thus forming the sulfate salt of the amine. The slurry was chilled to a temperature in the range of 0–5° C., and a solution of 41.4 g. of sodium nitrite in 100 ml. of water was added to the cooled amine sulfate slurry in dropwise fashion. After the addition had been completed, the reaction mixture containing the diazonium sulfate formed in the above diazotization was stirred in the cold for about 30 minutes. The cold solution was filtered and the filtrate was poured with stirring into a solution of 160 g. of potassium iodide in 500 ml. of water. Evolution of nitrogen was noticed immediately. After the addition of the cold diazonium salt solution had been completed, the reaction mixture was warmed to about 100° C. for about 2 hours and was then cooled. 2-iodo-3,5-dichlorobiphenyl formed in the above reaction was extracted with 500 ml. of ether. The ether extract was separated and was washed successively with water, 10 percent aqueous sodium thiosulfate, water, 10 percent sodium hydroxide, and water. The ether layer was dried and the ether removed therefrom by evaporation in vacuo. Distillation of the residue yielded 2-iodo-3,5-dichlorobiphenyl boiling in the range 132–135° C. at a pressure of about 0.05 mm. of mercury; $n_D^{25}=1.668$. The distillate solidified upon standing. 2-iodo-3,5-dichlorobiphenyl melted at about 42–45° C.

I claim:

1. A compound represented by the following formula:

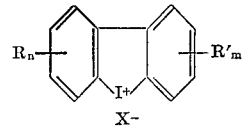

wherein R and R' are members of the group consisting of chlorine and bromine; n is a number from 1 to 3; m is a number from 0 to 3; and X⁻ is an anion of an acid having an acidic dissociation constant greater than $10^{-13}$.

2. Bis(2-chlorodibenziodolium) sulfate.

3. 2,4-dichlorodibenziodolium bisulfate.
4. Bis(3,7-dichlorodibenziodolium) sulfate.
5. Bis(2,4-dichlorodibenziodolium) sulfate.
6. 2-chlorodibenziodolium dihydrogen phosphate.

References Cited by the Examiner

UNITED STATES PATENTS 2,878,293  3/1959  Kinzer _____ 260—607

OTHER REFERENCES

Collette et al., Journal of the American Chemical Society, volume 78, 1956, pages 3819–3820.

TOBIAS E. LEVOW, *Primary Examiner.*

F. R. OWENS, W. BELLAMY, *Assistant Examiners.*